(12) United States Patent
Harper

(10) Patent No.: US 6,939,120 B1
(45) Date of Patent: Sep. 6, 2005

(54) DISK ALIGNMENT APPARATUS AND METHOD FOR PATTERNED MEDIA PRODUCTION

(75) Inventor: Bruce M. Harper, San Jose, CA (US)

(73) Assignee: Komag, Inc., San Jose, CA (US)

(*) Notice: Subject to any disclaimer, the term of this patent is extended or adjusted under 35 U.S.C. 154(b) by 348 days.

(21) Appl. No.: 10/243,380

(22) Filed: Sep. 12, 2002

(51) Int. Cl.⁷ .............................................. B29D 11/00
(52) U.S. Cl. ................ 425/384; 425/387.1; 425/405.1; 425/407; 425/810; 264/1.33
(58) Field of Search ............................. 425/384, 387.1, 425/405.1, 407, 810; 264/1.33; 100/92, 269.01; 384/12

(56) References Cited

U.S. PATENT DOCUMENTS

| | | |
|---|---|---|
| 4,470,864 A | 9/1984 | Haden et al. |
| 5,213,600 A | 5/1993 | Greschner et al. |
| 5,259,926 A | 11/1993 | Kuwabara et al. |
| 5,427,599 A | 6/1995 | Greschner et al. |
| 5,512,131 A | 4/1996 | Kumar et al. |
| 5,537,282 A | 7/1996 | Treves et al. |
| 5,653,166 A | 8/1997 | Mohammed et al. |
| 5,669,303 A | 9/1997 | Maracas et al. |
| 5,772,905 A | 6/1998 | Chou |
| 5,820,769 A | 10/1998 | Chou |
| 5,956,216 A | 9/1999 | Chou |
| 6,165,391 A * | 12/2000 | Vedamuttu ................. 264/1.33 |
| 6,295,923 B1 | 10/2001 | Berger |
| 6,309,580 B1 | 10/2001 | Chou |
| 6,482,742 B1 | 11/2002 | Chou |
| 6,499,331 B2 | 12/2002 | Moilanen et al. |
| 6,518,189 B1 | 2/2003 | Chou |
| 2002/0042027 A1 | 4/2002 | Chou et al. |
| 2002/0131718 A1 | 9/2002 | Tsuchida et al. |
| 2002/0132482 A1 | 9/2002 | Chou |
| 2002/0167117 A1 | 11/2002 | Chou |
| 2002/0177319 A1 | 11/2002 | Chou |

* cited by examiner

Primary Examiner—Donald Heckenberg
(74) Attorney, Agent, or Firm—Blakely, Sokoloff, Taylor & Zafman LLP (57) ABSTRACT

An apparatus and method for aligning a disk with an imprinting surface are described. In one embodiment, the apparatus has a die which includes an air-bearing mandrel having a tapered nose to engage an ID of the disk, a circular imprinting surface having a centerline concentric with the air-bearing mandrel, and an air-bearing cavity to position the disk. The axial movement of the top die towards the bottom die guides the ID of the disk into coincident alignment with the centerline of the top die.

37 Claims, 8 Drawing Sheets

DISK ALIGNMENT APPARATUS AND METHOD FOR PATTERNED MEDIA PRODUCTION

FIELD OF THE INVENTION

This invention relates to the field of disk drives, and more specifically, aligning and imprinting of disks for use in disk drive systems.

BACKGROUND OF THE INVENTION

A disk drive system typically consists of one or more magnetic recording disks and control mechanisms for storing data within approximately circular tracks on a disk. A disk is composed of a substrate and one or more layers deposited on the substrate. In most systems, an aluminum substrate is used. However, alternative substrate materials such as glass have various performance benefits such that it may be desirable to use a glass substrate.

To produce a disk substrate from a blank sheet of metal-based material such as aluminum or aluminum magnesium, the sheet may be stamped to generate a disk substrate having an inner diameter (ID) and an outer diameter (OD). After stamping the ID and OD, the disk-shaped substrate may be heat treated to remove stresses and then polished. The disk may then be coated with a polymer overcoat.

The trend in the design of magnetic hard disk drives is to increase the recording density of a disk drive system. Recording density is a measure of the amount of data that may be stored in a given area of disk. One method for increasing recording densities is to pattern the surface of the disk to form discrete tracks, referred to as discrete track recording (DTR). DTR disks typically have a series of concentric raised zones (a.k.a., lands, elevations, etc.) storing data and recessed zones (a.k.a., troughs, valleys, grooves, etc.) that may store servo information. The recessed zones separate the raised zones to inhibit or prevent the unintended storage of data in the raised zones.

One method of producing DTR magnetic recoding disks is through the use of a pre-embossed rigid forming tool (a.k.a., stamper, embosser, etc.). An inverse of the surface pattern is generated on the stamper, which is directly imprinted on the surface(s) of a disk substrate. Thin film magnetic recording layers are then sputtered over the patterned surface of the substrate to produce the DTR media having a continuous magnetic layer extending over both the raised zones and the recessed zones. To imprint tracks on a data storage disk substrate, an imprinting template may be attached to a flexible support, whose curvature can be altered by applying hydrostatic pressure. By suitably varying the pressure, the imprinting surface can be brought into contact with the disk substrate.

An imprinted disk may not be viable if the imprinting surface is not concentrically aligned with the disk substrate. Imprinted tracks that have excessive offset from a centerline of the disk substrate may not operate properly when read by a disk drive head. This requirement is particularly important in disks used in hard disk drives in which tracks may need to be imprinted on both sides. As such, imprinting a disk requires an alignment step, in which a centerline of the disk is aligned with a centerline of the imprinting surface, before the disk substrate is actually imprinted.

Current alignment methods typically require the use of high precision actuators or robotics. For example, the high precision actuators would first determine a centerline for the disk substrate and align it with a centerline of the imprinting surface. The use of such high precision actuators and robotics are expensive, with high maintenance costs, inconsistent accuracy and reliability, and slow cycle times. The high precision actuators and robotics are also significant pieces of machinery, requiring large amounts of floor space.

SUMMARY OF THE INVENTION

An apparatus and method for passively aligning a disk with an imprinting surface are described. In one embodiment, the apparatus has a top die that includes an air-bearing mandrel having a tapered nose to engage an ID of the disk, a circular imprinting surface having a centerline concentric with the air-bearing mandrel, and a bottom die having an air-bearing cavity to constrain the disk. The axial movement of the top die towards the bottom die guides the ID of the disk into coincident alignment with the centerline of the top die.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth such as examples of specific, components, processes, etc. in order to provide a thorough understanding of various embodiment of the present invention. It will be apparent, however, to one skilled in the art that these specific details need not be employed to practice various embodiments of the present invention. In other instances, well known components or methods have not been described in detail in order to avoid unnecessarily obscuring various embodiments of the present invention.

It should be noted that the apparatus and methods discussed herein may be used with various types of disks. In one embodiment, for example, the apparatus and methods discusses herein may be used with a magnetic recording disk. Alternatively, the apparatus and methods discussed herein may be used with other types of digital recording disks, for example, a compact disk (CD), a digital video disk (DVD), and a magneto-optical disk.

In one embodiment, the apparatus and method described herein may be implemented with an aluminum substrate. It should be noted that the description of the apparatus and method in relation to aluminum substrates is only for illustrative purposes and is not meant to be limited only to the alignment and imprinting aluminum or metal-based substrates. In an alternative embodiment, other substrate materials including glass substrates may be used, for example, a silica containing glass such as borosilicate glass and aluminosilicate glass. Other substrate materials including polymers and ceramics may also be used.

An apparatus and methods for using the apparatus to align a disk for patterned media production are described herein. In one embodiment, the disk is passively aligned with an imprinting surface, thereby eliminating the need for high precision actuators and alignment tools. In another embodiment, the apparatus includes a very high-precision die set that establishes the inherent side-to-side alignment and repeatability of the patterned media. An air-bearing supported alignment mandrel resides in the top die, as well as an imprinting surface coupled to a circular elastomer pad that accommodates thickness variations of a disk substrate. A centerline for the air-bearing mandrel matches a centerline for the imprinting surface. The bottom die contains an annular air "manifold" located substantially near the ID of a cavity to constrain the disk before alignment. All of the die body elements and mandrel are of circular configuration and like materials, thus minimizing thermal distortion and maintaining critical clearances at air-bearing surfaces. The alignment process is passive because the air-bearing mandrel freely guides a centerline of the disk into alignment with a centerline of the imprinting surface.

In an alternative embodiment, a precision die set establishes a fundamental side-to-side alignment and repeatability of the patterned media. Air-bearings are used in multiple places to attain precise, total system alignment. Specifically, air-bearing supported alignment mandrels are disposed in the top and bottom die portions. The air-bearing alignment mandrels have intermeshing, tapered nose portions. The bottom die rests in a double air-bearing nest with one planar surface and one spherical surface. A circular elastomer pad to accommodate substrate thickness variations may also be disposed central to the air-bearing mandrels adjacent to the substrate. Most of the die body elements and mandrel are of circular configuration and like materials, thus minimizing thermal distortion and maintaining critical clearances at air-bearing surfaces.

In another embodiment, an air-bearing supported alignment mandrel resides in the bottom die. Hermetically sealed die foils are welded over shallow cavities on top and bottom die pieces. Most of the die body elements and mandrel are of circular configuration and like materials, thus minimizing thermal distortion and maintaining critical clearances at air-bearing surfaces.

In another alternative embodiment, the patterned foils are aligned via pico-actuators and held in place. An air-bearing supported alignment mandrel resides in the bottom die to receive the disk. Most of the die body elements and mandrel are of circular configuration and like materials, thus minimizing thermal distortion and maintaining critical clearances at air-bearing surfaces.

Figure 1:
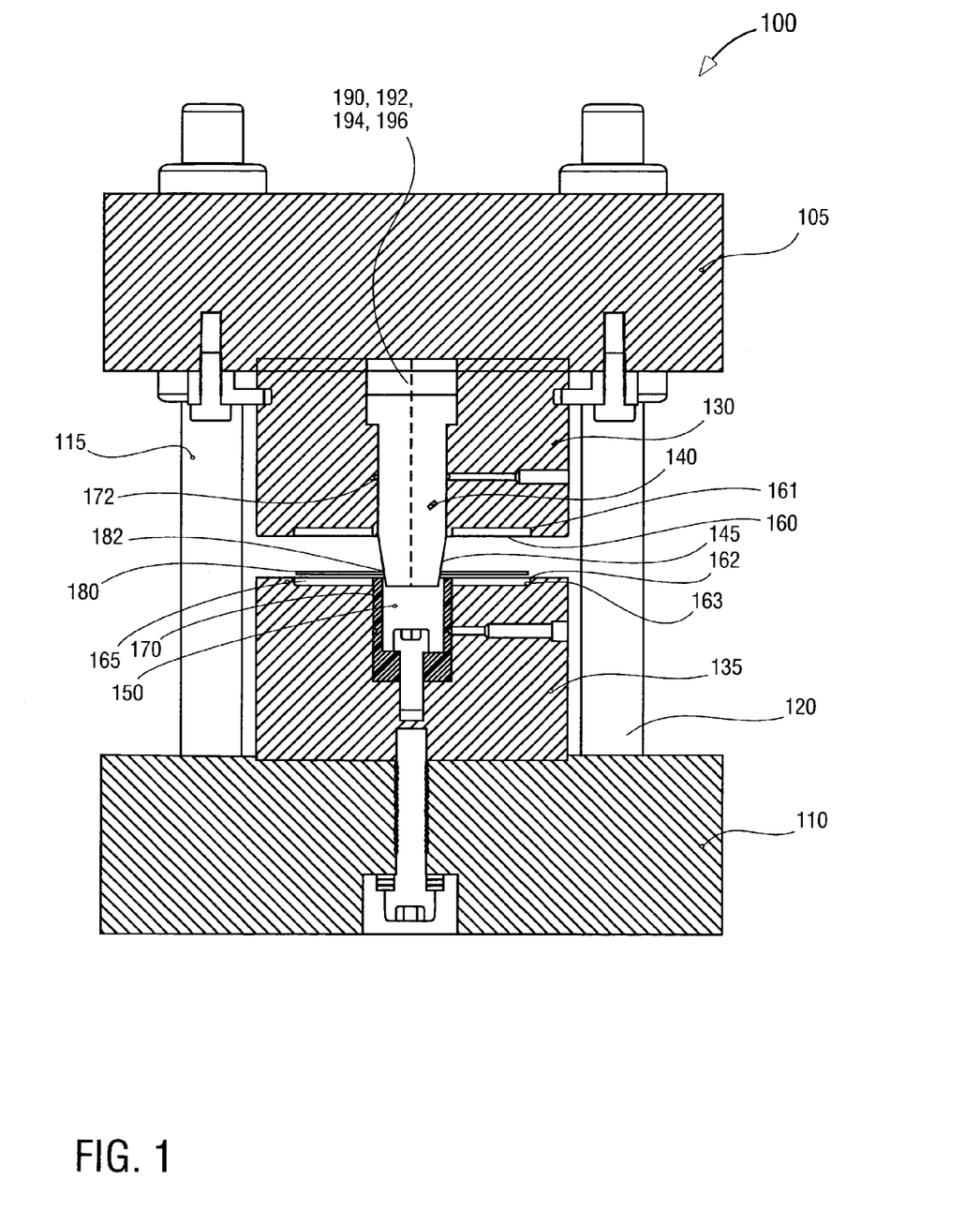
FIG. 1 illustrates one embodiment of a semi-passive disk alignment apparatus for patterned media production.

Referring to FIG. 1, a cross-sectional view of one embodiment of a disk alignment apparatus 100 for patterned media production is shown. In one embodiment, the apparatus 100 passively aligns and imprints a disk 180 or similar substrate. Disk 180 may be a magnetic disk for data storage (e.g., for use in a hard disk drive) or alternatively, disk 180 may be an optical-type disk. Apparatus 100 has top die 130 and bottom die 135 portions. Support portions 105, 110 and columns 115, 120 stabilize top die portion 130 and bottom die portion 135.

Top die 130 includes air-bearing mandrel 140 disposed near a middle portion of top die 130, and has a tapered nose oriented to face bottom die 135. Air-bearing mandrel is supported by air manifold 172 that enables air-bearing mandrel passive axial movement. Air-bearing mandrel 140 has a diameter sized to engage an ID 182 of disk 180. Top die 130 also has first imprinting surface 160 disposed around air-bearing mandrel 140. In one embodiment, first imprinting surface 160 may be adjacent or coupled to first elastomer pad 161 to accommodate variations in thickness of disk 180. First imprinting surface 160 may also be a foil having the track features to be pressed on a disk. In one embodiment, first imprinting surface 160 has a circular shape to match disk 180. A centerline for air-bearing mandrel 140 is aligned with a centerline 192 for first imprinting surface 160.

Bottom die 135 has a circular cavity 165 to contain an elastomeric annulus. Bottom die 135 also includes an annular air manifold 170 disposed substantially within cavity 165 to position disk 180. In one embodiment, disk 180 is positioned by floating disk 180 within cavity 165. Bottom die 135 also has a cylindrical opening 150 sized to receive tapered nose 145 of air-bearing mandrel 140. Bottom die 135 has second imprinting surface 162 adjacent to second elastomer pad 163, with a centerline 194 aligned with the centerline 192 of first imprinting surface 160 of air-bearing mandrel 140. In one embodiment, the die body elements including air-bearing mandrel 140 are of circular configuration and like materials, thus minimizing thermal distortion and maintaining critical clearances at the air-bearing surfaces. Examples of materials that may be used for the die body elements include, but are not limited to tool steels such D2, M2, and 440-C.

In one embodiment of a method to align and imprint disk 180 with apparatus 100, disk 180 may first be placed over circular cavity 165 (which may contain an elastomer and heating element) by any number of automated methods. For example, in one embodiment, a robot or a pick and place ("P&P") device places disk 180 in circular cavity 165. Annular air slot 170 disposed near ID 182 positions disk 180 by floating disk 180 a few thousands of an inch above lower die cavity 165. In an alternative embodiment, a second imprinting surface 162 adjacent second elastomer pad 163 may be disposed on disk cavity 165 and oriented to face a bottom side of disk 180. Disk 180 is initially axially constrained by shallow OD cavity walls that are a few thousands of an inch greater than the nominal diameter of the disk 180.

Apparatus 100 closes by top die 130 descending axially towards lower die 135. Upon die assembly 100 closure, tapered nose 145 of air-bearing mandrel 140 freely guides the floating disk ID 182 into coincident alignment with the centerline 190 of the top die 130. Because the air-bearing mandrel 140 moves freely on its own axis via air-bearing support, with its own weight directing a small downward force, air-bearing mandrel 140 remains in controlling contact with disk 180 as the centerline 190 of air-bearing mandrel 140 is aligned with the centerline 196 of disk 180 (and vice versa). Very low volumes of clean dry air ("CDA") may be necessary to support the disk 180 and air-bearing mandrel 140.

With the centerline 196 of disk 180 aligned with the centerline 192 of air-bearing mandrel 140 and first imprinting surface 160, top die 130 continues to descent towards lower die portion 135. Tapered nose 145 of air-bearing mandrel 140 lowers toward bottom die 135, and first imprinting surface 160 becomes in contact with the disk surface to imprint disk 180. Depending on whether an imprinting surface is disposed on top die 130, bottom die 135, or both (e.g., first and second imprinting surfaces 160, 162), either one or both sides of disk 180 may be imprinted. This method provides precise side-to-side alignment and repeatability for the imprinting of disk 180. Apparatus 100 passively aligns disk 180 with imprinting surfaces eliminating the need for precision actuators or similar machinery. As such, the use of apparatus 100 provides greater reliability, reduced operating costs and maintenance, improved accuracy and repeatability, and faster cycle times. In one embodiment, apparatus 100 attains a disk-to-die alignment of +/−5 microns or better.

Figure 2:
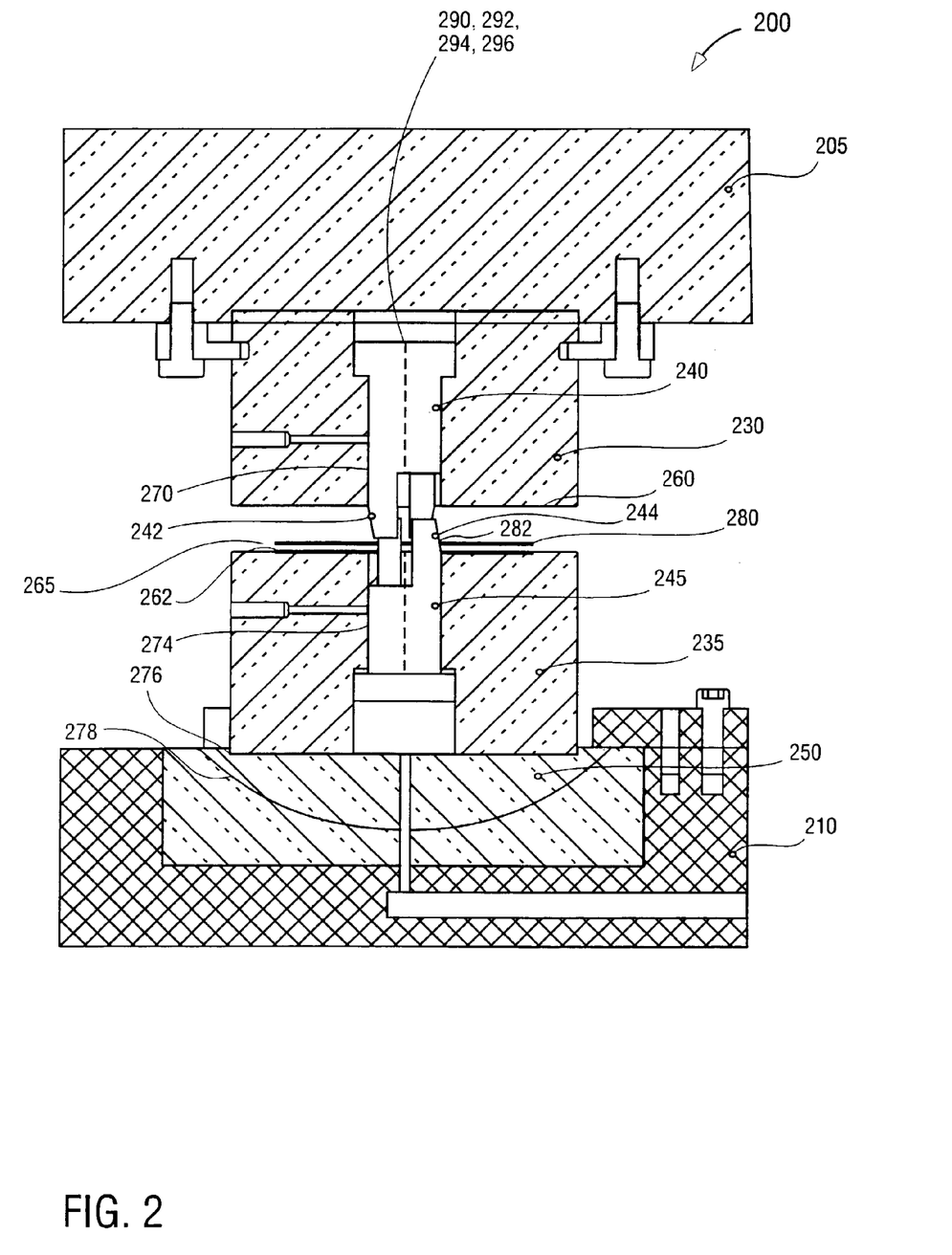
FIG. 2 illustrates one embodiment of a passive disk alignment apparatus for patterned media production.

FIG. 2 illustrates a cross-sectional view of another embodiment of a disk alignment apparatus 200 for patterned media production. Apparatus 200 passively aligns and imprints a substrate (e.g., a disk). Apparatus 200 has top die 230 and bottom die 235 portions. Top die 230 includes first air-bearing mandrel 240 disposed near a middle portion of top die 230, and has a first tapered nose 242 oriented to face bottom die 235. First air-bearing mandrel 240 has a diameter sized to engage an ID 282 of disk 280. Top die 230 also has a first imprinting surface 260 disposed around first air-bearing mandrel 240. In one embodiment, first imprinting surface 260 may include an elastomer pad to accommodate surface variations of disk 580 or imprinting surface 260 (e.g., an imprinting toil). In one embodiment, first imprinting surface 260 has a circular shape to match disk. A centerline 290 for first air-bearing mandrel 240 is aligned with a centerline 292 of first imprinting surface 260. Support portions 205, 210 stabilize top die portion 230 and bottom die portion 235.

Bottom die portion 235 has second air-bearing mandrel 245 disposed near a middle portion, with a second tapered nose 244 oriented to first tapered nose 242 of first air-bearing mandrel 240. As with first tapered nose 242 of first air-bearing mandrel 240, second tapered nose 244 of second air-bearing mandrel 245 is also sized to engage an ID 282 of disk 280. In one embodiment, bottom die 235 may also have a second imprinting surface 262 disposed around second air-bearing mandrel 245. A centerline 294 for second air-bearing mandrel 245 is aligned with a centerline 296 of second imprinting surface 262. In one embodiment, bottom die portion 235 of apparatus 200 rests in a dual air-bearing nest, with one planar surface 276 and one spherical surface 278. The dual air-bearing nest of planar surface 276 and spherical surface 278 allows spherical seat 250 of bottom die portion 235 freedom of motion to rotate about a theoretical center 298 of the top surface of disk 280.

In one embodiment of a method to align and imprint disk 280 with apparatus 200, disk 280 may first be placed on bottom die portion 235 (e.g., by robot or P&P device) such that second tapered nose 244 of second air-bearing mandrel 245 engages an ID 282 of disk 280. Specifically, disk 280 is placed on the lower mandrel 245 and is secured several thousandths of an inch above second imprinting surface 262 within a cavity 265 of bottom die portion 235. The cavity 265 is sized slightly larger than disk 280 to contain disk 280 within bottom die portion 235.

Disk 280 is initially axially located by the first tapered nose and then by the second tapered nose 244 of second air-bearing mandrel 245 of bottom die portion 235. As discussed above, a duplicate precision air-bearing linear mandrel (e.g., first air-bearing mandrel 240) resides in top die portion 230. Upon closure of top and bottom die portions 230, 235, the noses 242, 244 of first and second air-bearing mandrels 240, 245 have three finger-like configurations with tapered faces which allow them to mesh, capturing disk 280 on both ID chamfers. Thus, the bottom die portion 235 aligns to top die portion 230 using centered disk 280 as the connecting medium. First air-bearing mandrel 240 of top die portion 230 is urged downward by its own weight (and air pressure if needed), and second air-bearing mandrel 245 of bottom die portion 235 is urged upward via a small differential air pressure. Bottom die portion 235 freely floats on a flat air-bearing plane 276 into alignment with the centerline 290 of top die portion 230. Plane matching of first imprinting surface 260 and second imprinting surface 262 is attained by the passive movement of the spherical air bearing surface 278 of spherical seat 250. Surface 278 has its radius of curvature focused at the center point of the top surface of the disk 280 to minimize relative motion between disk 280 and second imprinting surface 262. In one embodiment, excess freedom of motion of spherical seat 250 may be controlled by cleats. Very low volumes of CDA may be used to support air-bearing mandrels 240, 245. As such, apparatus 200, by utilizing a full-floating, multi-axis lower die portion and air-bearing mandrels, achieves auto-alignment of both sides of a disk to imprinting surfaces. If die sets 205, 210 are very precise, the spherical alignment feature may be removed and the planar system retained to achieve coaxial alignment of 205, 210.

Figure 3:
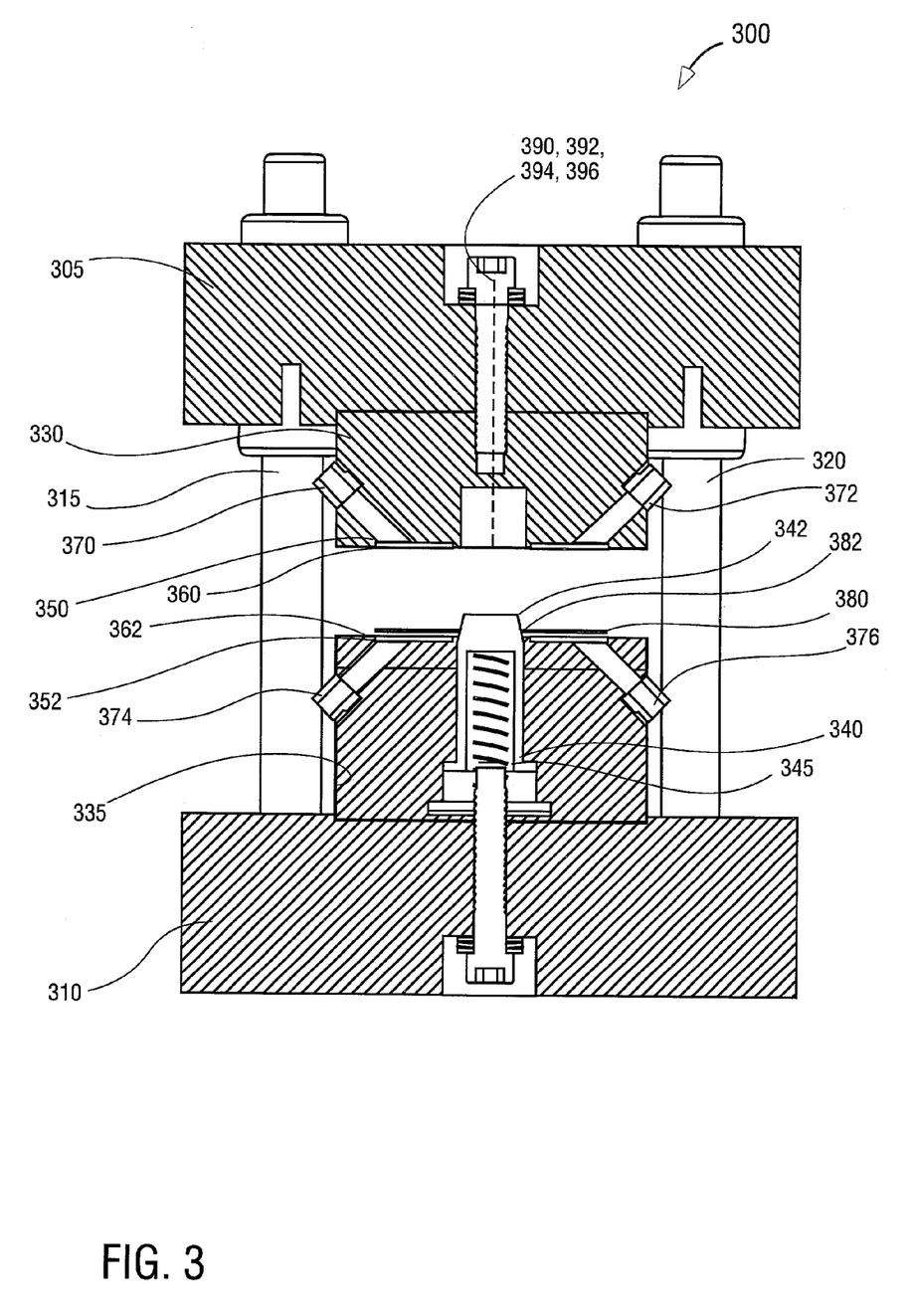
FIG. 3 illustrates another embodiment of a semi-passive disk alignment apparatus for patterned media production.

FIG. 3 illustrates a cross-sectional view of another embodiment of a disk alignment apparatus for patterned media production. Apparatus 300 has top die portion 330 and bottom die portion 335 that establishes a fundamental side-to-side alignment and repeatability of patterned media (e.g., a disk). Bottom die portion 335 has air-bearing supported alignment mandrel 340 disposed near a center portion, with a tapered nose 342 extending towards top die portion 330. Support portions 305, 310 and columns 315, 320 stabilize top die portion 330 and bottom die portion 335.

Tapered nose 342 of air-bearing mandrel 340 is sized to engage an ID 382 of disk 380. As described in greater detail below with respect to FIGS. 7A and 7B, imprinting surfaces 360, 362 may be hermetically sealed over top and bottom portions 330, 335 to form shallow cavities 350, 351, 352, 353. Top and bottom die portions 330, 335 also have pressurized fluid outlets 370, 372, 374, 376 in fluid communication with the hermetically sealed shallow cavities 350, 351, 352, 353 for the delivery and removal of fluids (e.g., liquid or gas) used to press imprinting surfaces 360, 362 on disk 380. In one embodiment, apparatus 300 may have a total of four pressurized fluid outlets, although more or less than four may be utilized. A centerline 390 for air-bearing mandrel 340 of bottom die portion 335 is aligned with imprinting surfaces 360, 362 disposed on top and bottom die portions 330, 335. Bottom die portion 335 also has spring 345 to allow mandrel 340 axial movement. All of the die parts may be of circular configuration and like materials, thereby minimizing thermal distortion and maintaining critical clearances at the air-bearing surfaces.

Figure 7A:
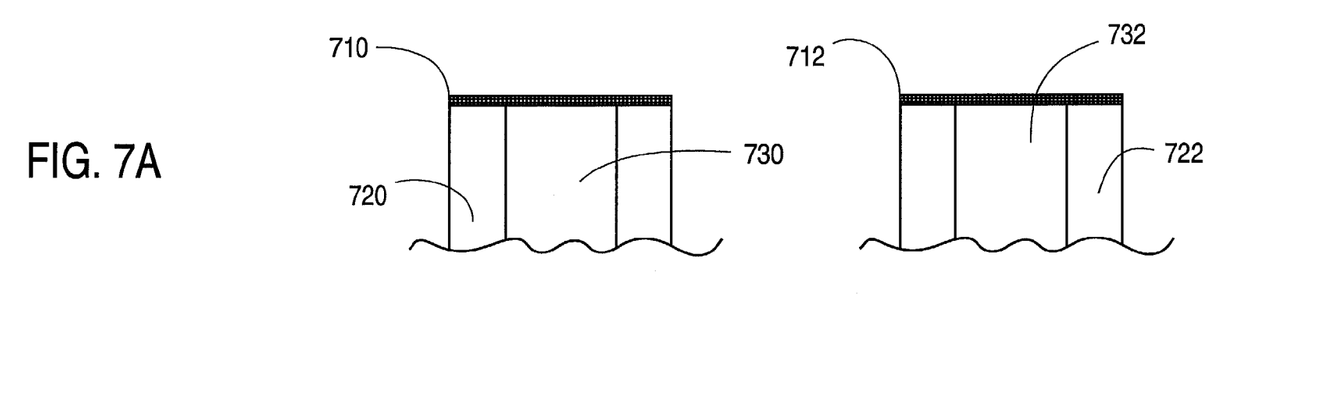
FIG. 7A illustrates a cross-sectional view of one embodiment of imprinting surfaces sealed over die portions.
Figure 7B:
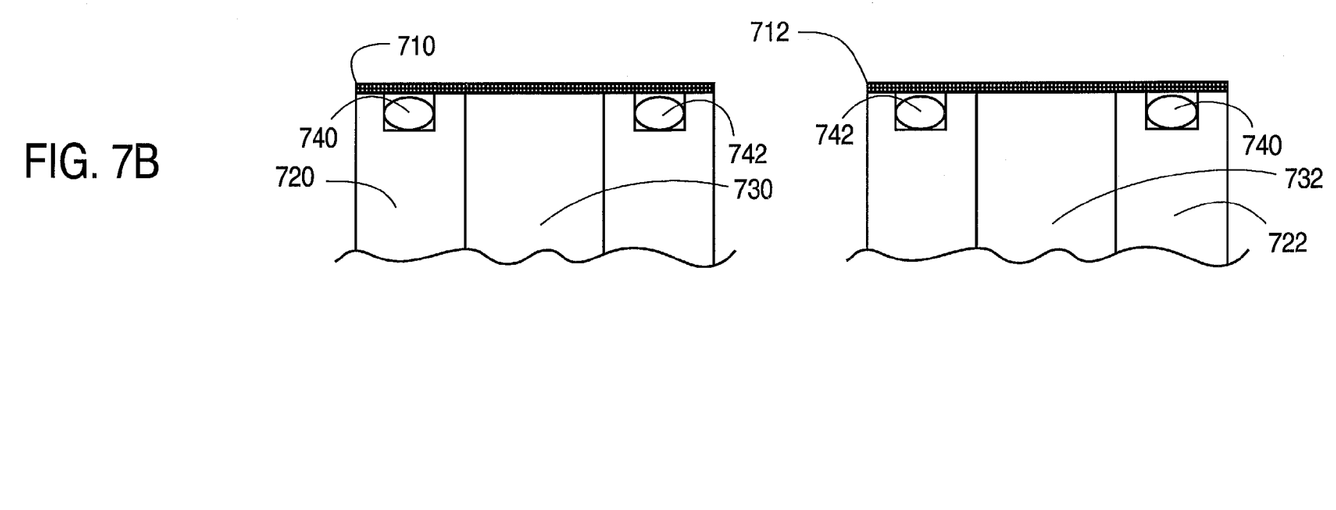
FIG. 7B illustrates a cross-sectional view of another embodiment of imprinting surfaces sealed over die portions.

In one embodiment, imprinting surfaces 360, 362 are made of compliant material to allow for flexibility when making contact with a disk substrate (e.g., disk 380). The disk substrate may possess inherent variations in thickness which would require that imprinting surfaces 360, 362 be flexible to conform to the variations. FIG. 7A illustrates a cross-sectional view of one embodiment of imprinting surfaces 710, 712 hermetically sealed over die portions 720, 722 to form hermetically sealed cavities 730, 732. For clarity of explanation, the entire disk alignment apparatus is not shown. Imprinting surfaces 710, 712 may be sealed to die portions 720, 722 by welding (e.g., laser or braze), soldering, or electric arc welding. By welding imprinting surfaces 710, 712 to die portions 720, 722, leakage of fluid passed through cavities 730, 732 may be prevented during the imprinting process. FIG. 7B illustrates a cross sectional view of an alternative embodiment of hermetically sealing imprinting surface 710, 712 over die portions 720, 722. In this embodiment, O-rings 740, 742 may be used to seal imprinting surfaces 710, 712 over die portions 720, 722. A slight vacuum at die cavities 730, 732 may hold imprinting surfaces 710, 712 in place until clamping action of die closure is established. Alternatively, elastomeric materials (e.g., rubber and other comparable polymers) and metals (e.g., for use with ultra high vacuum seals) may be used in place of o-rings.

It may be appreciated by one skilled in the art that a pre-formed cavity adjacent to an imprinting surface may not be necessary for the application of localized heating and cooling elements. In one embodiment, a mechanical piston may be disposed adjacent to the imprinting surface to force contact with a disk substrate. Alternatively, the application of a heating or cooling element to the imprinting surface may cause a cavity to form as the imprinting surface flexes to make contact with the disk substrate.

Referring again to FIG. 3, in one embodiment of a method to align and imprint a disk 380 with apparatus 300, disk 380 is placed on air-bearing mandrel 340 of bottom die portion 335 (e.g., by a robot or P&P device). Upon placement, disk 380 residing several thousandths of an inch above imprinting surface 362 of the lower die cavity 352. As top die portion 330 closes over bottom die portion 335, disk 380 locks in place with ID 382 of disk 380 engaging the tapered nose portion 342 of air-bearing mandrel 340. Upon closure of top and bottom die portions 330, 335 a centerline 396 of disk 380 is aligned with the centerlines 390, 392 of top and bottom die portions. Next, the cavities 350, 352 underlying imprinting surfaces 360, 362 are charged with high-pressure fluid (e.g., a gas or liquid) forcing the features of the imprinting surfaces into the polymer coating of disk. Fluid is delivered through pressurized fluid outlets 370, 372, 374, 376. Examples of fluids that may be used include, but are not limited to high-pressure gas (nitrogen), hydraulic oil, and thermal working fluids such as Dow Therm™ or Marlotherm N™. To complete the imprinting process, pressure is reduced to zero and the fluid is allowed to flow through the cavities followed by cooling fluid to carry off residual heat and cool the impressed surface of disk 380. Cooling the disk and imprinting surface may facilitate the separation of the disk from the imprinting surface.

The coating of a disk substrate may be an integral part of a patterned substrate or removed after suitable development. By imprinting features in a coating via a stamper, it may be used as a stencil to enable patterning of the substrate surface by subsequent material additive or subtractive processes (e.g., plating through a mask or etching through a mask), and can often be facilitated if the imprinting is performed at an elevated substrate temperature. In the latter case the resultant mask would be removed after performing the additive or subtractive steps. Higher temperature can soften the material to be imprinted and thereby improve embossed feature fidelity and increase stamper life. Moreover, separation of the stamper from the imprinted surface may be facilitated by cooling the substrate below the imprinting temperature. Hence, it may be desirable to equip the press with elements to heat and cool the disk substrate prior to and after imprinting it via the stamper. Provision of such cooling and heating elements is preferably accomplished by placing such elements in close proximity to the back of each stamper. Localized heating and cooling of the disk substrate may not be necessary in order achieve successful stamping. The entire disk alignment apparatus (e.g., apparatus 300) may be subjected to heating and cooling elements to stamp a disk substrate.

As explained above, one method of heating and cooling may include using hot and cool fluids in the cavities behind the imprinting surfaces (e.g., imprinting surfaces 360, 362), membranes, or foils. Alternatively, annular blocks may be disposed in close proximity to the imprinting surfaces. These blocks may contain embedded electric heating coils or thermoelectric cooling devices. In another embodiment, annular quartz heating lamps or resistive ribbons adhered disposed near the imprinting surface may be used in combination with cooling fluids.

Figure 8:
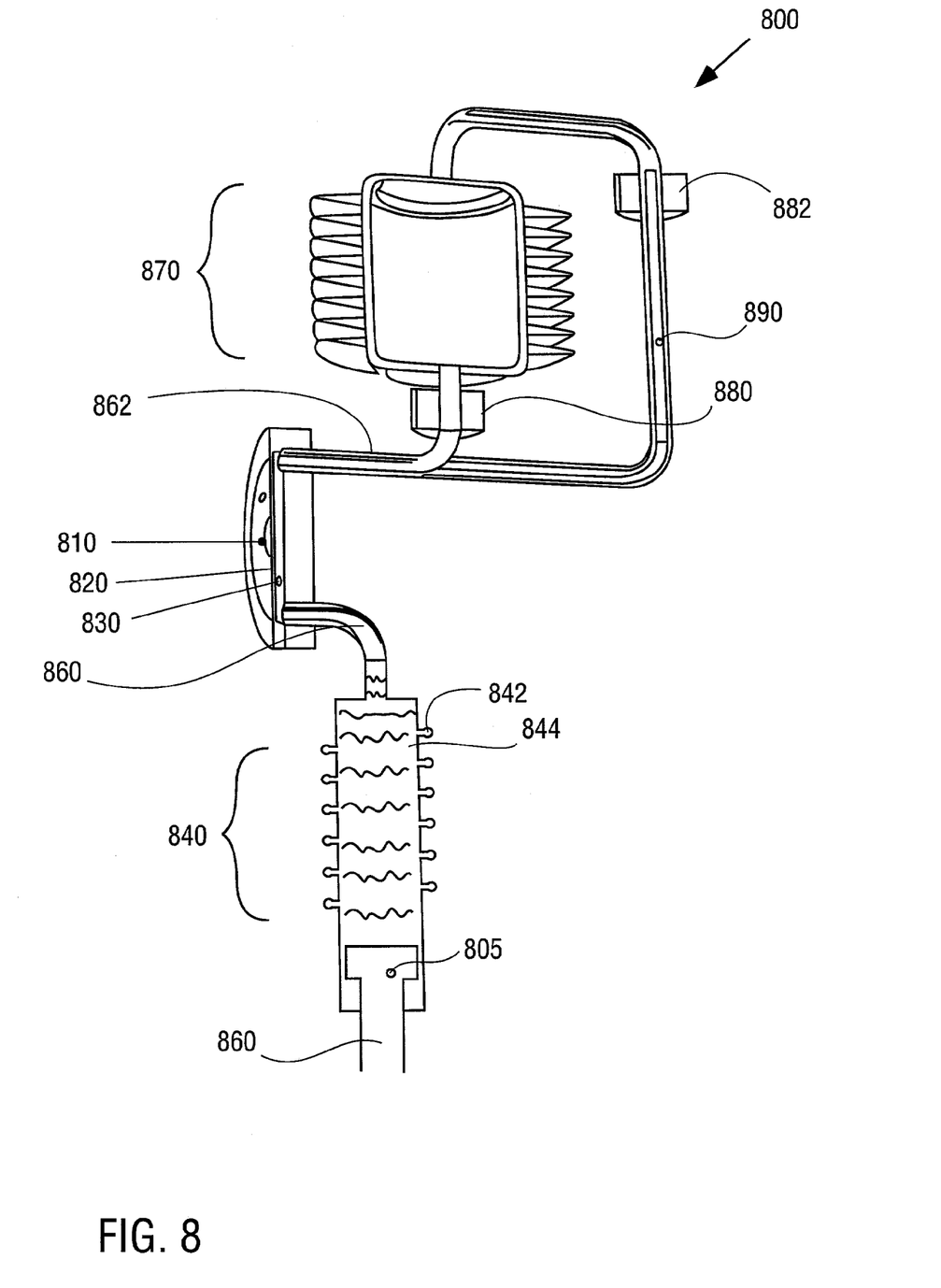
FIG. 8 illustrates one embodiment of a thermodynamic press that may be used for imprinting a disk substrate.

FIG. 8 illustrates one embodiment of a heating and cooling device for imprinting a disk. The device includes a thermodynamic press 800 having pressurized fluid sources in communication with fluid outlets (e.g., 370, 372, 374, 376 of FIG. 3) of a disk alignment system for the delivery of heating and cooling elements for imprinting a disk substrate. For clarity of explanation, a partial cross-sectional view of disk substrate 810 is shown, with imprinting surface 820 disposed adjacent to disk substrate 810. A hermetically sealed cavity 830 is disposed adjacent to imprinting surface 820. Cavity 830 also has port 860 in fluid communication with heating element 840 and port 862 in fluid communication with heat exchanger 870.

In operation, heating coils 842 heats a fluid 844 (e.g., a liquid or gas) contained in heating element 840 to a working temperature. Piston 805 of heating element 840 displaces hot, working fluid 844 from heating element 840 through port 860 and into cavity 830. Working fluid exits cavity 830 through port 862 displacing an inert gas (e.g., Nitrogen) towards heat exchanger 870. Check valves 880, 882 may be activated to stop a free-flow of working fluid 844 and allow piston 805 to achieve a pre-selected force to compress imprinting surface 820 against disk substrate 810 by transferring the heat of working fluid 844. Piston 805 may then be retracted, lowering a system pressure, and withdrawing hot working fluid 844 through fluid return line 890. Chilled gas from heat exchanger 870 follows and replaces the exiting hot fluid from cavity 830 and cools imprinting surface 820.

Figure 4:
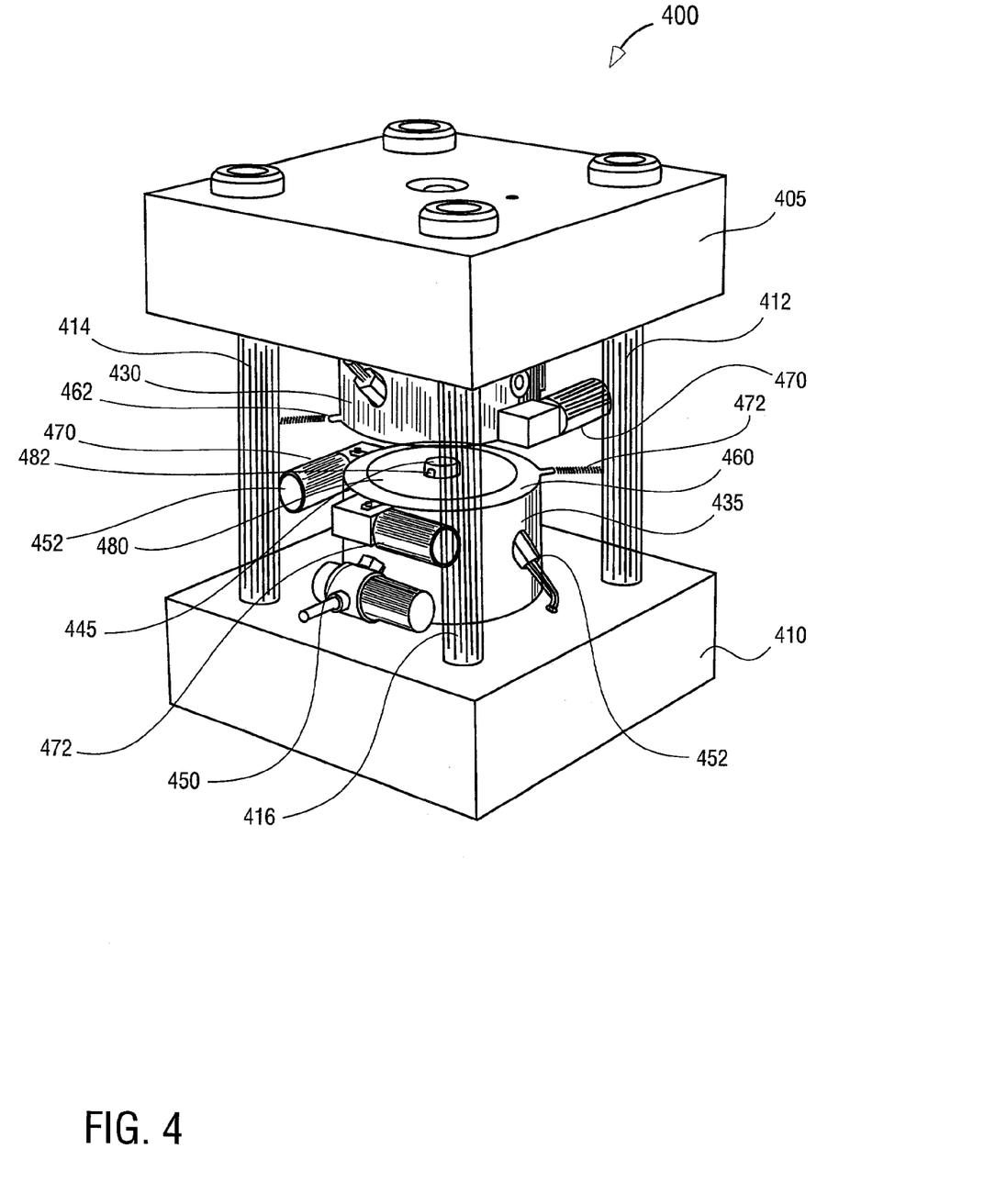
FIG. 4 illustrates another embodiment of a semi-passive disk alignment apparatus for patterned media production.

FIG. 4 illustrates a perspective view of another embodiment of a disk alignment apparatus 400 for patterned media production. Apparatus 400 aligns and imprints a substrate (e.g., a disk). Apparatus 400 has top die portion 430 and bottom die portion 435 that establishes fundamental repeatability of the patterned media (e.g., a disk). Support portions 405, 410 and columns 412, 414, 416 (a fourth column is not shown in this view) stabilize top die portion 430 and bottom die portion 435. Bottom die portion 435 has air-bearing supported alignment mandrel (not shown) disposed near a center portion, with a tapered nose 445 extending towards top die portion 430. Tapered nose 445 of air-bearing mandrel is sized to engage an ID 482 of disk 480. Top and bottom portions 430, 435 also have first and second imprinting surfaces. In this view, only second, imprinting surface 462 is shown.

In one embodiment, first and second imprinting surfaces 460, 462 are held in place by pico-actuators 470, 472, which control side-to-side movement of first and second imprinting surfaces 460, 462. Top and bottom die portions 430, 435 also have pressurized fluid outlets 450, 452 for the delivery and removal of fluids used to charge annular pistons (not shown), thus press imprinting surfaces on disk 480. A centerline 490 for air-bearing mandrel 440 of bottom die portion 435 is aligned with imprinting surfaces 460, 462 disposed on top and bottom die portions 430, 435. All of the die body elements and air-bearing mandrel 440 are of circular configuration and like materials, thus minimizing thermal distortion and maintaining critical clearances at the air-bearing surfaces.

In one embodiment of a method to align and imprint a disk 480 with apparatus 400, disk 480 is placed on the tapered nose portion 445 of mandrel 440 (e.g., by a robot or P&P device), residing several thousandths of an inch above second imprinting surface 462 of lower die portion 435. Top die portion 430 is closed over disk 480 and locked in place against imprinting surfaces 460, 462. Upon closure of top and bottom die portions 430, 435, a centerline of disk 480 is aligned with the centerlines of top and bottom die portions 430, 435 (centerlines are not shown in this perspective view of apparatus 400). The cavities (not shown) underlying the imprinting surfaces 460, 462 are then charged with high-pressure gas forcing the imprint features into the polymer coating. Fluid is delivered through pressurized fluid outlets 450, 452. To complete the imprinting process, pressure is reduced to zero and a purging gas flows through the cavities to carry off residual heat and chill the impressed surfaces of disk 480. In an alternative method, a charge of combustible gas, such as hydrogen and oxygen, may be used to create heat and percussive pressure to emboss the imprinting surfaces into the polymer layer of disk 480. Subsequent purging of the cavities cools the foil and polymer.

Figure 5:
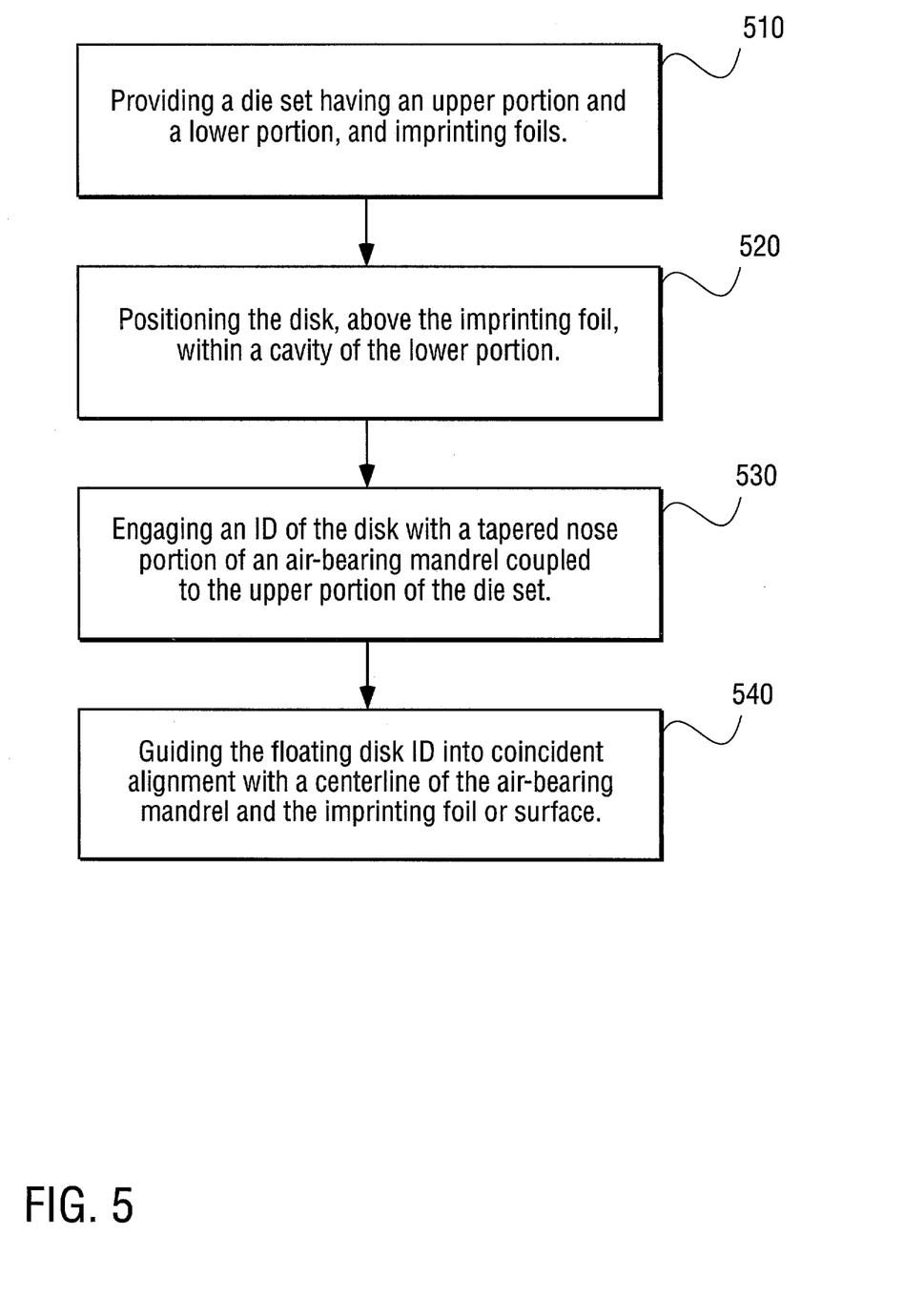
FIG. 5 illustrates, in flowchart form, one method for aligning a disk for patterned media production.

FIG. 5 illustrates, in flowchart form, one method for passively aligning a disk for patterned media production. The method starts at block 510 by providing a die set having an upper portion and a lower portion, with a surface of the imprinting surface or foil disposed on the lower portion and facing the upper portion. Next, at block 520, a disk floats above the imprinting surface within a cavity of the lower portion. At block 530, an ID of the disk engages a tapered nose portion of an air-bearing mandrel coupled to the upper portion of the die set. At block 540, top die portion closes over the lower portion, such that tapered nose portion of the air-bearing mandrel guides the floating disk ID into coincident alignment with a centerline of the air-bearing mandrel and the imprinting surface.

Figure 6:
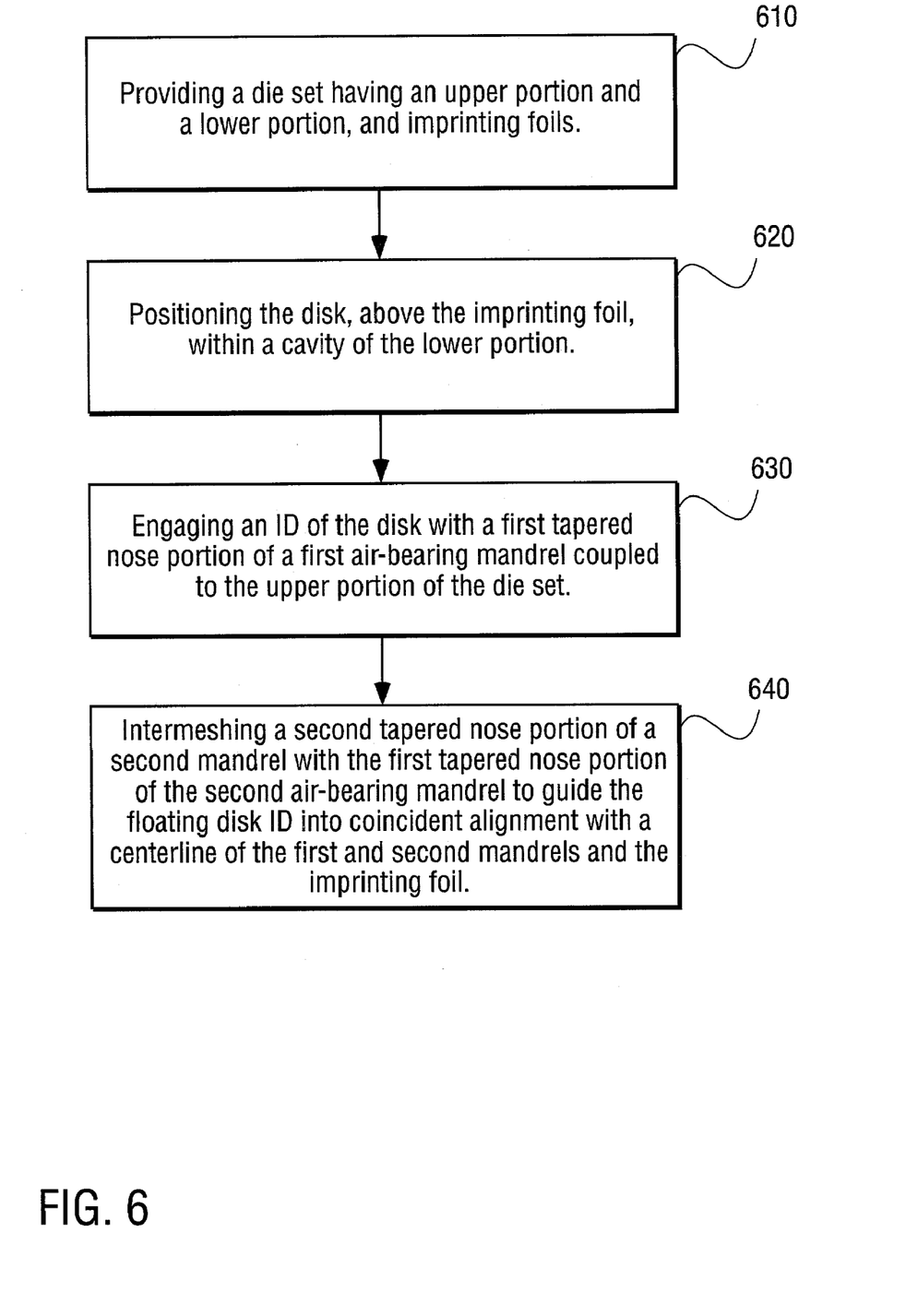
FIG. 6 illustrates, in flowchart form, an alternative method for aligning a disk for patterned media production.

FIG. 6 illustrates, in flowchart form, another method for passively aligning a disk for patterned media production. The method starts at block 610 by providing a die set having an upper portion and a lower portion, with a surface of an imprinting foil disposed on the lower portion and facing the upper portion. At block 620, a disk positioned above the imprinting foil within a cavity of the lower portion. At block 630, an ID of the disk engages a first tapered nose portion of a first air-bearing mandrel coupled to the upper portion of the die set. At block 640, a second tapered nose portion of a second air-bearing mandrel, coupled to the upper portion of the die set, intermeshes with the first tapered nose portion. Upon closure of top and bottom portions, the first and second tapered nose portions guides the lower die via the disk ID into coincident alignment with a centerline of the fist and second air-bearing mandrels and the imprinting foils.

In the foregoing specification, the invention has been described with reference to specific exemplary embodiments thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. An apparatus to imprint a disk, comprising:
    a top die comprising:
        an air-bearing mandrel having a tapered nose to engage an ID of the disk; and
        a first imprinting surface having a first centerline concentric with the air-bearing mandrel; and
    a bottom die having an air-bearing cavity to support and constrain the disk, wherein the axial movement of the top die towards the bottom die guides the ID of the disk into coincident alignment with the first centerline of the top die.

2. The apparatus of claim 1, further comprising a plurality of fluid cavities disposed adjacent to the imprinting surface.

3. The apparatus of claim 1, further comprising a plurality of pico-actuators coupled to the imprinting surface.

4. The apparatus of claim 1, wherein the bottom die further comprises a second imprinting surface having a second centerline in coincident alignment with the air-bearing mandrel.

5. The apparatus of claim 1, wherein the first imprinting surface comprises a flexible material to accommodate surface variations of the imprinting surface.

6. The apparatus of claim 1, further comprising a flexible elastomer pad coupled to the first imprinting surface.

7. The apparatus of claim 2, further comprising a device in fluid communication with the plurality of fluid cavities to deliver heating and cooling elements for imprinting the disk.

8. The apparatus of claim 7, wherein the device comprises a thermodynamic press.

9. An apparatus to imprint a disk, comprising:
    a top die having a first air-bearing mandrel with a tapered nose;
    a bottom die having a second air-bearing mandrel with a tapered nose that opposes the first air-bearing mandrel; and
    a first imprinting surface disposed around the first air-bearing mandrel, wherein the first air-bearing mandrel, the second air-bearing mandrel, and the first imprinting surface share a common centerline, and wherein the tapered noses of the first and second air-bearing mandrels intermesh to engage an ID of the disk.

10. The apparatus of claim 9, wherein the imprinting surface comprises a flexible material to accommodate surface variations of the disk.

11. The apparatus of claim 9, further comprising a plurality of fluid cavities disposed adjacent to the imprinting surface.

12. The apparatus of claim 9, further comprising a plurality of pico-actuators coupled to the imprinting surface.

13. The apparatus of claim 9, further comprising a second imprinting surface disposed around the second air-bearing mandrel.

14. The apparatus of claim 9, wherein the bottom die comprises a planar air-bearing surface supporting the bottom die to enable alignment with the top die.

15. The apparatus of claim 9, wherein the bottom die further comprises a dual air-bearing nest of a planar surface and a spherical surface to enable the bottom die to align with and rotate about a center of the disk.

16. The apparatus of claim 9, further comprising a flexible elastomer pad coupled to the first imprinting surface.

17. The apparatus of claim 11, further comprising a device in fluid communication with the plurality of fluid cavities to deliver heating and cooling elements for imprinting the disk.

18. The apparatus of claim 17, wherein the device comprises a thermodynamic press.

19. An apparatus, comprising:
  means for passively aligning an imprinting surface with a disk; and
  means for imprinting the disk with the imprinting surface, wherein a first air-bearing mandrel freely guides a first centerline of the disk into coincident alignment with a second centerline of the imprinting surface.

20. The apparatus of claim 19, wherein means for passively aligning further comprises:
  means for providing a die set having an upper portion and a lower portion, with the imprinting surface disposed on the lower portion and facing the upper portion;
  means for positioning the disk, above the imprinting surface, within a cavity of the lower portion;
  means for engaging an ID of the disk with a tapered nose portion of the air-bearing mandrel coupled to the upper portion of the die set; and
  means for closing the top portion over the lower portion.

21. The apparatus of claim 20, further comprising means for adjusting a horizontal position of the imprinting surface with a plurality of actuators coupled to the imprinting surface.

22. The apparatus of claim 20, further comprising means for charging the imprinting surface with a heating element to force the imprinting surface on the disk.

23. The apparatus of claim 22, further comprising means for charging the imprinting surface with a gas.

24. The apparatus of claim 22, further comprising means for charging the imprinting surface with a liquid.

25. The apparatus of claim 20, further comprising means for charging the imprinting surface with a cooling element to facilitate a separation of the imprinting surface from the disk.

26. The apparatus of claim 20, further comprising means for cooling the disk with a fluid.

27. The apparatus of claim 20, further comprising means for cooling the disk with a gas.

28. The apparatus of claim 20, further comprising means for cooling the disk with a liquid.

29. The apparatus of claim 19, wherein means for passively aligning further comprises:
  means for providing a die set having an upper portion and a lower portion, with the imprinting surface disposed on the lower portion and facing the upper portion;
  means for positioning the disk, above the imprinting surface, within a cavity of the lower portion;
  engaging an ID of the disk with a first tapered nose portion of the first air-bearing mandrel coupled to the lower portion of the die set; and
  means for intermeshing a second tapered nose portion of a second air-bearing mandrel, coupled to the upper portion of the die set, to close the top portion over the lower portion, wherein, upon die closure, the first and second tapered nose portions guide the disk ID into coincident alignment with a centerline of the first and second air-bearing mandrels and the imprinting surface.

30. The apparatus of claim 29, further comprising means for adjusting a horizontal position of the imprinting surface with a plurality of pico-actuators coupled to the imprinting surface.

31. The apparatus of claim 29, further comprising means for charging the imprinting surface with a heating element to force the imprinting surface on the disk.

32. The apparatus of claim 31, further comprising means for charging the imprinting surface with a gas to force the imprinting surface on the disk.

33. The apparatus of claim 31, further comprising means for charging the imprinting surface with a liquid to force the imprinting surface on the disk.

34. The apparatus of claim 29, further comprising means for charging the imprinting surface with a cooling element to facilitate a separation of the imprinting surface from the disk.

35. The apparatus of claim 31, further comprising means for cooling the disk with a fluid.

36. The apparatus of claim 35, further comprising means for cooling the disk with a gas.

37. The apparatus of claim 35, further comprising means for cooling the disk with a liquid.

* * * * *